United States Patent [19]

Dewhirst

[11] Patent Number: 4,681,256

[45] Date of Patent: Jul. 21, 1987

[54] THERMOSTATIC STEAM TRAPS

[75] Inventor: Keith Dewhirst, Stroud, England

[73] Assignee: Spirax Sarco Limited, England

[21] Appl. No.: 855,280

[22] Filed: Apr. 24, 1986

[51] Int. Cl.$^4$ .............................................. F16T 1/02
[52] U.S. Cl. .................................. 236/56; 236/93 A; 236/99 R
[58] Field of Search ............... 236/56, 58, 42, 93 A, 236/99 R, 99 J, 86

[56] References Cited

U.S. PATENT DOCUMENTS

| | | | |
|---|---|---|---|
| 634,538 | 10/1899 | McElroy | 236/58 |
| 2,289,020 | 7/1942 | Jones | 236/58 |
| 3,725,989 | 4/1973 | Reid et al. | 29/257.1 R |
| 4,244,518 | 1/1981 | Foller | 236/58 |
| 4,295,605 | 10/1981 | Clayton et al. | 236/56 |
| 4,549,691 | 10/1985 | Jiandani | 236/58 |
| 4,560,105 | 12/1985 | Jiandani | 236/58 |

Primary Examiner—William E. Tapolcai
Attorney, Agent, or Firm—Larson and Taylor

[57] ABSTRACT

There is provided, in a thermostatic steam trap that can operate in either of two modes merely dependent upon which way round the trap is connected in a steam flow line, a temperature-responsive element (9) in which there is a valve member (23) that projects from a housing (16) of the element (10) to an extent dependent upon movement of a diaphragm (19) within the housing (16). Movement of the valve member (23) out of the housing (16) to close on a seat (6) is opposed by a spring clip (8), arms (14) of which embrace the outside of the housing (16), so that if the diaphragm (19) fails the trap as a whole fails with the valve (23/6) open. Conveniently the spring clip (8) serves a further function in that lugs (15) of the clip locate on a wall of the valve seat (6) to locate the element (9) in the trap.

6 Claims, 3 Drawing Figures

THERMOSTATIC STEAM TRAPS

BACKGROUND OF THE INVENTION

1. Field of the Invention.

This invention relates to thermostatic steam traps and in particular to such a trap which can operate in two different modes. In this regard, reference should be made to U.S. Pat. Nos. 4,549,691 and 4,560,105 (Jiandani) which indicate that the purpose of a steam trap is to vent air, or other noncondensables, and condensate from a steam pressure system with a minimum loss of steam. As further indicated in these patents, there are several different types of trap, of which some are better suited to particular uses than others. Discussions about this point contained in U.S. Pat. Nos. 4,549,691 and 4,560,105 can be summarised as follows. It may be necessary to utilise more than one type of trap in a single process plant. For example, in average chemical process plants and oil refineries there are two important uses for steam traps. They are used in connection with steam tracing of product lines, which must be heated to keep their contents at desired temperature and/or viscosity. They are also used for draining condensate from steam mains. These two uses, however, require different operating characteristics. In the draining of condensate from steam mains, the condensate is removed at approximately saturation temperature even though it contains sufficient sensible heat. This is so because the presence of condensate is undesirable and, under some conditions, hazardous. In the draining of steam tracing lines, however, condensate is removed at temperatures well below saturation in order to achieve maximum utilisation of sensible heat. Plants often stock thermostatic traps for the first use, and so-called liquid expansion traps for the second use, and it will be appreciated that there is a need for a single trap able to perform functions traditional to both thermostatic traps and liquid expansion traps. By this it is not meant merely to have a common housing with interchangeable internals but, rather, a trap which is truly operable in two modes, in one of which the trap is to discharge condensate at a temperature close to saturated steam temperature, while in the other the discharge is to be at a temperature significantly below saturated steam temperature.

2. Description of the Prior Art

Attention is directed to the detailed discussions of prior art contained in U.S. Pat. Nos. 4,549,691 and 4,560,105, and to the prior art listed under "References Cited" in each of these patents. The steam trap forming the subject of U.S. Pat. No. 4,560,105 is well illustrated in FIG. 2 of the patent where it is shown as being a bellows-actuated thermostatic steam trap (A) having a bellows (41) carrying a valve member (45) of a valve (45/22) for opening and closing the trap, the bellows being disposed between connections (20/21 and 30/31) which are identical to one another so as to be selectively connectable in a steam flow line with the valve (45/22) disposed either downstream of, or upstream of, the bellows (41). The trap operates, when connected with the valve disposed downstream of the bellows, in a first mode in which, in normal operation, the trap discharges condensate at a temperature close to saturated steam temperature. When connected with the valve disposed upstream of the bellows, the valve operates in a second mode in which in normal operation condensate is discharged at a temperature significantly below steam temperature. One or other of these modes can be simply obtained merely by selecting which way round the trap is connected in a flow line. The bellows (41) is disposed in an internal chamber (40) of a housing (11/12), the bellows having opposed ends (42, 43) interconnected by an accordion side wall (44). The bellows contains a volatile liquid whose saturation curve closely parallels but is few degrees below that for saturated steam.

When the trap of U.S. Pat. No. 4,560,105 is to operate in its first mode, in which hot condensate is discharged until the appearance of steam, the trap is connected in a steam system such that condensate flows into the chamber containing the bellows before reaching the valve of the trap. Thus the environment within the chamber is reflective of pressure and temperature conditions immediately upstream of the trap. When cold, the trap is wide open, freely discharging noncondensables and cool condensate. As the condensate temperature increases, the liquid in the bellows evaporates and generates a significant vapour pressure. When the condensate temperature reaches a few degrees Farenheit (e.g. 10 degrees) below saturated steam temperature, the vapour pressure within the bellows equals the pressure of the condensate in the surrounding chamber. As the condensate temperature increases farther and approaches that of steam, the internal vapour pressure exceeds the external pressure, causing the bellows to expand, driving the valve member of the valve toward its seat. If steam temperature is reached the valve member is driven tightly into its seat, closing the trap. As the condensate surrounding the bellows cools, the vapourised liquid within the bellows condenses, reducing the internal pressure. The bellows contracts, opening the trap for discharge. Thus, the thermostatic trap when operating in its first mode discharges condensate at close to saturation temperature.

If it is desired that the trap of U.S. Pat. No. 4,560,105 should operate in its second mode, in which there is modulation of a stream of condensate having a temperature significantly below the equilibrium temperature for saturated steam, the valve is connected into a steam system in reversed configuration, as compared with the first mode, so that the valve is interposed between the chamber and the steam system. As a result, once the trap is operating, conditions in the chamber, in particular the pressure in the chamber, are ambient conditions (e.g. atmospheric) rather than system conditions. In this second mode, upon start up, the trap is open, freely discharging noncondensables and cool condensate until the condensate reaches a predetermined temperature below 212 degrees F. (e.g. anywhere from approximately 6 to 20 degrees, depending upon pressure at the trap inlet). As the hot condensate flows over the bellows the liquid in the bellows boils, exerting a pressure which expands the bellows, pushing the valve toward its seat, and thus throttling flow. Because the surrounding pressure in the chamber is always atmospheric, the bellows always expands at the predetermined temperature below 212 degrees F. irrespective of the condensate line pressure. Flow through the valve of condensate approaching 212 degrees F., may cause the valve momentarily to close but, because the bellows is downstream of the valve, the bellows is then cut off from its heat source and the valve begins to open again. Thus there is a continuous search for equilibrium which results in a modulated discharge from the trap (i.e. increased and reduced flow but nearly always some flow) once initial heat-up has occurred. This is different from the first mode of operation and is attributable to the differences in environment in the chamber. The valve member movement is relatively small, of the order of small fractions of an inch, but such relatively small movement is enough to produce the desired results.

A drawback with the steam traps of U.S. Pat. Nos. 4,549,691 and 4,560,105 is that if the bellows should fail, there will be equalisation of pressure as between the interior and the exterior of the bellows with the result that the valve closes. In other words, these traps fail closed and this is undesirable as in such circumstances there is a tendency for process temperature to rise.

Attention is also drawn to U.S. Pat. No. 4,295,605 (Clayton et al), to the prior art listed in this patent under "References Cited", and, in particular, to the thermostatic element of the balanced pressure thermostatic steam trap shown in FIG. 2B of U.S. Pat. No. 4,295,605. This element comprises a housing (6) within which there is disposed a multi-diaphragm arrangement (2B) consisting of two diaphragms (23, 24) sealed to one another at their peripheries so as to define an interior void (10) that opens from the housing (6) through an aperture (11) in the bottom wall (7) of the housing (6). The lower diaphragm (23) is fast with this bottom wall, whereas the upper diaphragm (24) is free to move up and down and carries for moving with it a valve member (13) that projects through the aperture (11). The interior of the housing (6), outside the multi-diaphragm arrangement (2B), is filled with volatile fluid (15). As in the case of each of U.S. Pat. Nos. 4,549, 691 and 4,560,105, if the multi-diaphragm arrangement (17) fails, there is equalisation of pressure across the movable diaphragm (24) and this trap also fails closed.

SUMMARY OF THE INVENTION

According to the present invention there is provided a thermostatic steam trap having a temperature-responsive element carrying a movable part of a valve for opening and closing the trap, this element being disposed in a passageway for fluid flow so as to be between two connections of the trap either of which can serve as an inlet to the trap for the fluid flow with the other serving as an outlet from the trap for this flow so that the trap is selectively connectable in a steam flow line either (A) with the passageway permanently open to the steam line and the valve serving to open and close to atmosphere the passageway downstream of the element whereby in operation condensate is discharged from the trap at a temperature close to saturated steam trap, or (B) with the passageway permanently open to atmosphere and the valve disposed upstream of the element whereby in operation condensate is discharged from the trap at a temperature significantly below steam temperature;

wherein:

the temperature-responsive element comprises
   a housing,
   a multi-diaphragm arrangement within the housing,
   an interior void in said arrangement, defined by the diaphragms of the arrangement and opening from the housing through an aperture in the housing, and
   volatile fluid filling the interior of the housing outside the multi-diaphragm arrangement, said movable part of said valve being disposed in the interior void for valve opening and closing movement with a movable one of the diaphragms, this valve member part being able to project through said aperture to cooperate with a fixed part of the valve to close the valve;

and wherein:

the temperature-responsive element further comprises a spring arrangement embracing the outside of the housing and acting between the housing and said movable valve member part so as to oppose movement of this valve member part out of the housing whereby this spring arrangement serves to bias the valve into open condition. As, in this steam trap, the spring arrangement biases the valve into open condition, this trap will fail open if the multi-diaphragm arrangement fails. Conveniently, and as described hereinafter, the spring arrangement is constructed to serve a dual function, that is to bias the valve as just discussed, and to locate the temperature-responsive element as a whole in the trap.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENT

Figure 1:
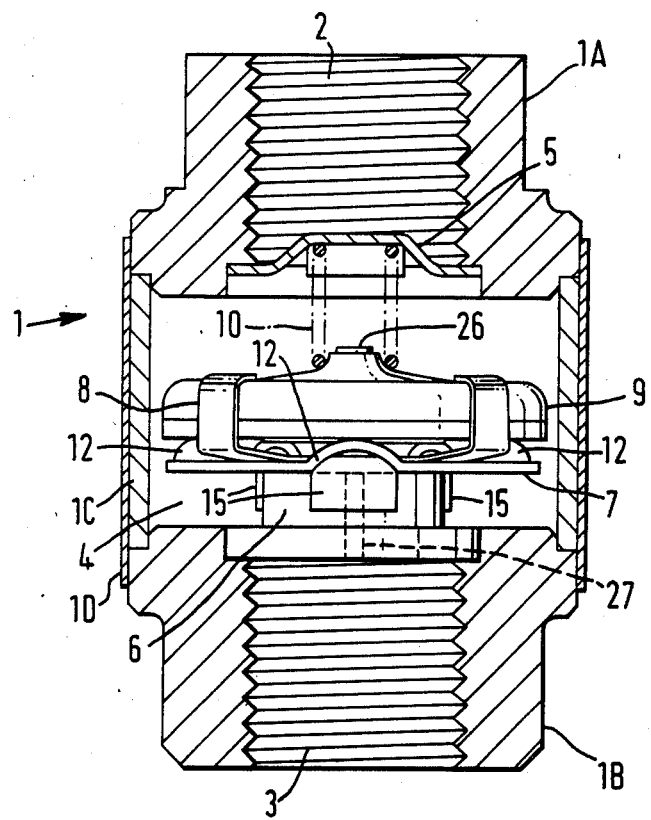
FIG. 1 is a mainly sectional view of a steam trap.

The steam trap of the Figures is a dual mode thermostatic steam trap having a housing 1 that consists of first and second end portions 1A and 1B and a central portion 1C all held fast to one another by an outer central sleeve 1D welded in position. Each of the end portions 1A, 1B is internally threaded for connection in a steam line, so that there is an inlet or outlet passage 2, 3 at each end of the housing 1. Between the passages 2 and 3 there is a central chamber 4 so that there is, through the trap, a passageway 2/4/3.

Across the inner end of the passage 2 in the housing end portion 1A there is made fast a spring receiver 5. In the inner end of the passage 3 in the housing end portion 1B there is made fast a valve seat 6. A spacer plate 7 supported by the valve seat 6 is disposed between the valve seat 6 and a location clip 8 of a temperature responsive thermostatic element 9, the plate 7, clip 8 and element 9 being held in place as a unit supported by the valve seat 6 by a spring 10 acting in compression between the element 9 and the spring receiver 5.

The spacer plate 7 is of overall circular configuration with a central, clover-leaf like aperture 11. On one side of the spacer plate 7 there are three raised portions 12 that abut the element 9, each of these portions being in line with a corresponding one of the outward extensions of the clover-leaf like central aperture 11.

The location clip 8 has a central body portion 13 from which extend three arms 14 that are folded around the element 9 at their outer ends so as loosely to embrace the element 9. Between the arms 14 three location lugs 15 extend from the clip body portion 13 away from the element 9. These lugs 15 pass through the spacer plate central aperture 11, each through one of the outward extensions of this aperture, and loosely embrace the outer wall of the valve seat 6.

Figure 2:
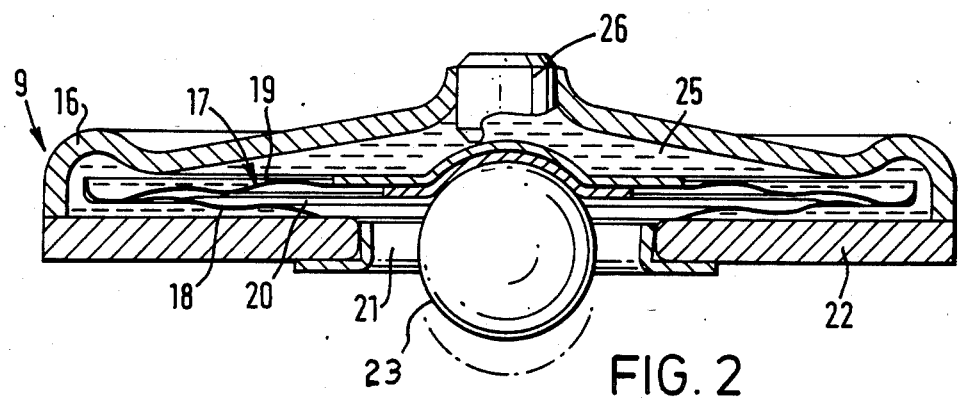
FIG. 2 is a sectional view of a component of the trap that is not shown in section in FIG. 1.
Figure 3:
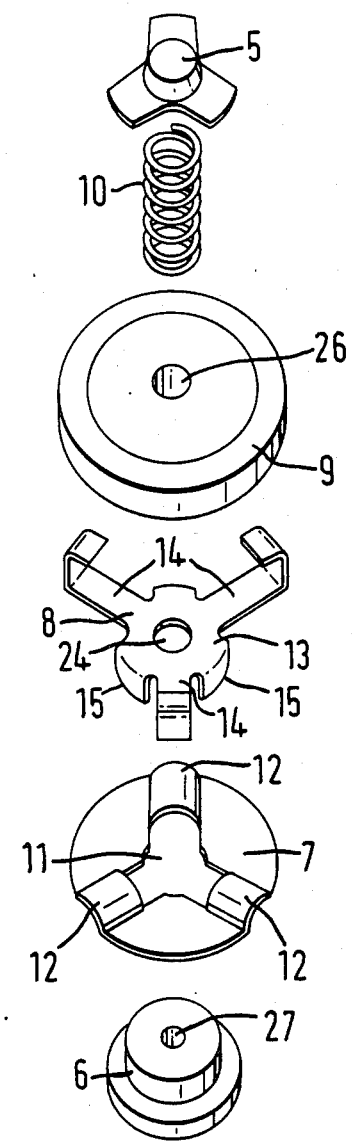
FIG. 3 is an exploded perspective view of components of the trap of FIG. 1.

The thermostatic element 9, as best shown in FIG. 2, comprises a housing 16 within which there is disposed a multi-diaphragm arrangement 17 consisting of two diaphragms 18, 19 sealed to one another at their peripheries so as to define an interior void 20 that opens from the housing 16 through an aperture 21 in one wall 22 of the housing 16. One diaphragm 18 is fast with the housing wall 22, whereas the other diaphragm 19 is free to move towards and away from the diaphragm 18/ wall 22. The diaphragm 19 that is free to move carries for moving with it a valve member 23 that projects through the aperture 21. With the unit — plate 7/clip 8/element 9 — held in place in the trap housing 1 by the spring 10, the valve member 23 further projects through a central hole 24 in the location clip 8 for seating on the valve seat 6. The hole 24 is, however, of smaller diameter than the valve member 23 so that the valve member cannot pass right through the hole 24. The interior of the housing 16 outside the multi-diaphragm arrangement 17 is filled with volatile fluid 25. Opposite the valve member 23 the housing 16 is formed so that its interior acts as a back stop 26 for the valve member 23.

For operation in its first mode, the steam trap is connected in a steam system with its passage 2 as inlet and its passage 3 as outlet so that condensate flows into the central chamber 4 before reaching the valve 23/6. Before steam is turned on, the trap is in the condition shown in FIGS. 1 and 2, that is the multi-diaphragm arrangement 17 is expanded so that the valve member 23 is fully withdrawn into the housing 16. The thermostatic element 9 is thus held, by the spring 10, against the spacer plate 7 so as to be supported by the valve seat 6 but with the valve member 23 clear of the valve seat so that a bore 27 through the seat 6 is open. When the steam is first turned on condensate passes through the open trap. As warmer condensate reaches the trap, heat is transmitted to the volatile fluid 25 which expands with the result that the multi-diaphragm arrangement 17 begins to be forced to collapse thereby moving the valve member 23 closer to the valve seat 6. At a predetermined temperature t1 below the saturated steam temperature corresponding to the pressure at the trap, the volatile fluid 15 boils and begins to exert vapour pressure. When the inside of the multi-diaphragm arrangement 17 is at steam pressure, the outside, because of the temperature head, is at a pressure which is higher by an amount p. This excess pressure forces the valve member 23 down onto its seat 6. Thus the trap closes just before steam temperature is reached. Condensate is then held up in the trap until it has cooled to the temperature t1 below steam temperature. At this point the vapour pressure in the housing 16 is less than the steam pressure outside the multi-diaphragm arrangement 17 so that this arrangement is able to expand again and the valve member 23 therefore lifts off the valve seat 6.

It will be appreciated that in operation in its first mode as just described, the environment within the chamber 4 is reflective of pressure and temperature conditions immediately upstream of the trap, and in normal operation in this mode the trap discharges condensate at a temperature close to saturated steam temperature.

For operation in its second mode, the trap is connected into a steam system in reversed configuration so that its passage 3 is its inlet and its passage 2 is its outlet. Connected in this way, once the trap is operating, conditions in the chamber 4 are ambient conditions (e.g. atmospheric) rather than system conditions. Upon start up the trap is open, freely discharging noncondensables and cool condensate until the condensate reaches a predetermined temperature t2 below 212° F., whereat the fluid 25 boils exerting pressure which expands the arrangement 17, pushing the valve member 23 towards its seat 6 and thus throttling the flow. Because the surrounding pressure in the chamber 4 is always atmospheric, the arrangement 17 always expands at the predetermined temperature t2 irrespective of the condensate system pressure. Flow through the valve of condensate approaching 212° F. may cause the valve momentarily to close but, because the arrangement 17 is (in this mode) downstream of the valve, the arrangement 17 is then cut off from its heat source and the valve begins to open again. Thus there is a continuous search for equilibrium which results in a modulated discharge from the trap (i.e. increased and reduced flow but nearly always some flow) once initial heat-up has occurred. The valve movement is relatively small, but enough to produce the desired results.

In either of the modes of operation described, should the multi-diaphragm arrangement 17 fail, there will be equalisation of pressure across the diaphragm 19 but any tendency of the valve member 23 to close onto its seat 6 in these circumstances is resisted by the location clip 8. This clip is pre-set to ensure that in the cold state the valve member 23 is held against its back stop 26 within the housing 16. As heat-up occurs and the valve member 23 moves out of the housing 16 it extends the location clip 8. Should failure of this arrangement 17 occur, the clip 8 serves to push the valve member 23 back into the housing 16 to hold the valve open. "Fail open" is preferable to "fail close" as the process in the steam system can then continue at correct temperature even through heat may be wasted through the trap. If a trap fails in closed condition there is a tendency for process temperature to rise. It will be noted that the member provided for ensuring that the trap fails open, i.e. the clip 8, conveniently serves a dual function in that, by the co-operation of its lugs 15 with the valve seat 6 this member also acts to locate the element 9 in the trap.

I claim:

1. A thermostatic steam trap comprising:
   a passageway for fluid flow;
   two connections constituting opposite ends of the passageway;
   a valve that opens and closes the trap having a valve seat disposed in the passageway; and
   a temperature-responsive element carrying a movable part of the valve that co-operates with the valve seat to open and close the trap;
   either of the connections comprising an inlet to the trap for the fluid flow with the other being an outlet from the trap for this flow, the trap thus being selectively connectable in a steam flow line either
   (A) with the passageway permanently open to the steam line and the valve opening and closing the passageway downstream of the element to atmosphere to discharge condenste from the trap at a temperature close to saturated steam temperature, or
   (B) with the passageway permanently open to atmosphere and the valve disposed upstream of the element to discharge condensate from the trap at a temperature significantly below steam temperature;

wherein:

the temperature-response element comprises
- a housing,
- a multi-diaphragm arrangement within the housing,
- an interior void in said arrangement, defined by the diaphragms of the arrangement and opening from the housing through an aperature in the housing, and
- volatile fluid filling the interior of the housing outside the multi-diaphragm arrangement, said movable part of said valve being carried by a movable one of the diaphragms, being disposed in the interior void, and projecting through said aperture to seat on fixed part of said valve seat to close the valve;

and wherein:

the temperature-responsive element further comprises
- a spring arrangement that embraces the outside of the housing,
- acts between the housing and said movable part of the valve,
- opposes movement of said movable part of the valve out of the housing, and
- biases the valve into open condition.

2. A steam trap according to claim 1, wherein the spring arrangement has arms that engage the housing to mount the spring arrangement on the housing, these arms extending from a portion of the spring arrangement that has a hole for receiving said movable valve member part, this valve member part being capable of passing only partially through this hole.

3. A steam trap according to claim 1, wherein the spring arrangement has location means that co-operates with said fixed part of the valve to locate the temperature-responsive element in the trap.

4. A steam trap according to claim 1, wherein the spring arrangement has arms that engage the housing to mount the spring arrangement on the housing, these arms extending from a portion of the spring arrangement that has a hole for receiving said movable valve member part, this valve member part being capable of passing only partially through this hole, the spring arrangement further having location lugs extending from said portion of the spring arrangement and embracing a wall of said fixed part of the valve so as to locate the temperature-responsive element in the trap.

5. A steam trap according to claim 1, and comprising a spacer between the housing of the temperature-responsive element and said fixed part of the valve.

6. A steam trap according to claim 1, wherein the spring arrangement has arms that engage the housing to mount the spring arrangement on the housing, these arms extending from a portion of the spring arrangement that has a hole for receiving said movable valve member part, this valve member part being capable of passing only partially through this hole, the spring arrangement further having location lugs extending from said portion of the spring arrangement and embracing a wall of said fixed part of the valve so as to locate the temperature-responsive element in the trap, and the trap further comprising a spacer between the housing of the temperature-responsive element and said fixed part of the valve, the location lugs passing through an aperture in this spacer.

* * * * *